Jan. 5, 1971 L. S. PAPP 3,552,101

FILTER APPARATUS

Filed Jan. 23, 1969 4 Sheets-Sheet 1

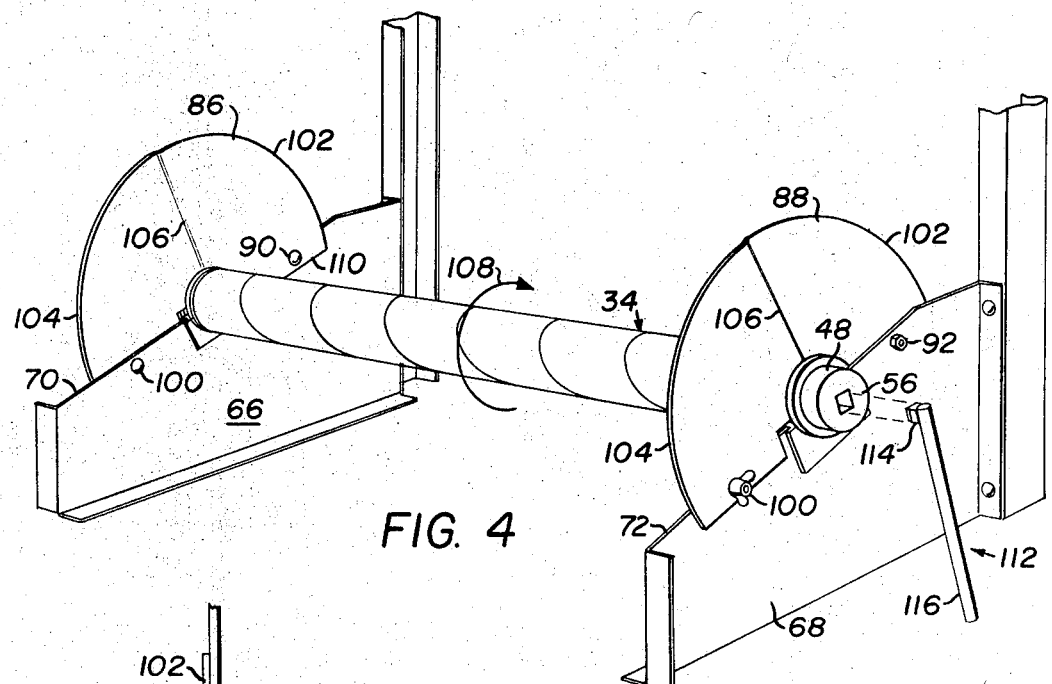
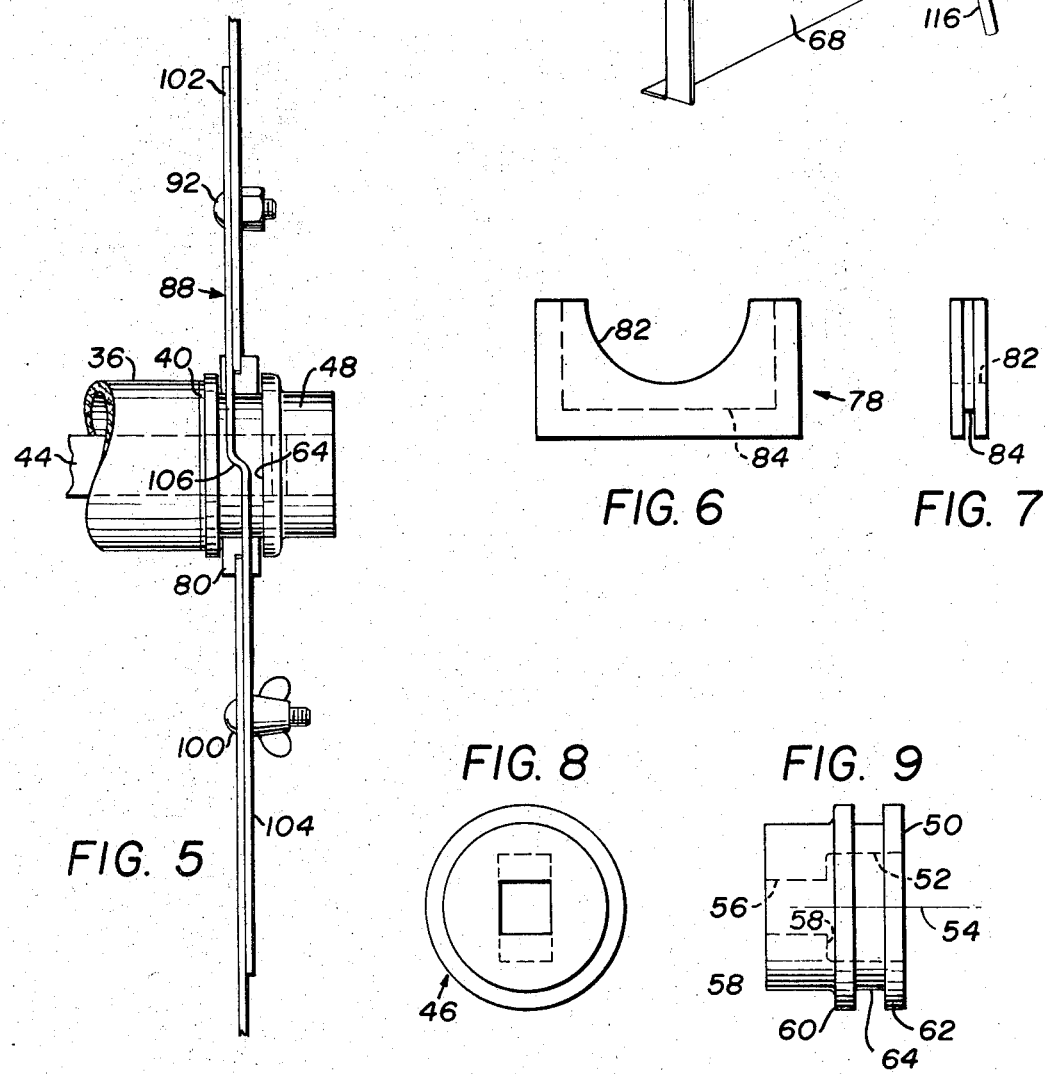

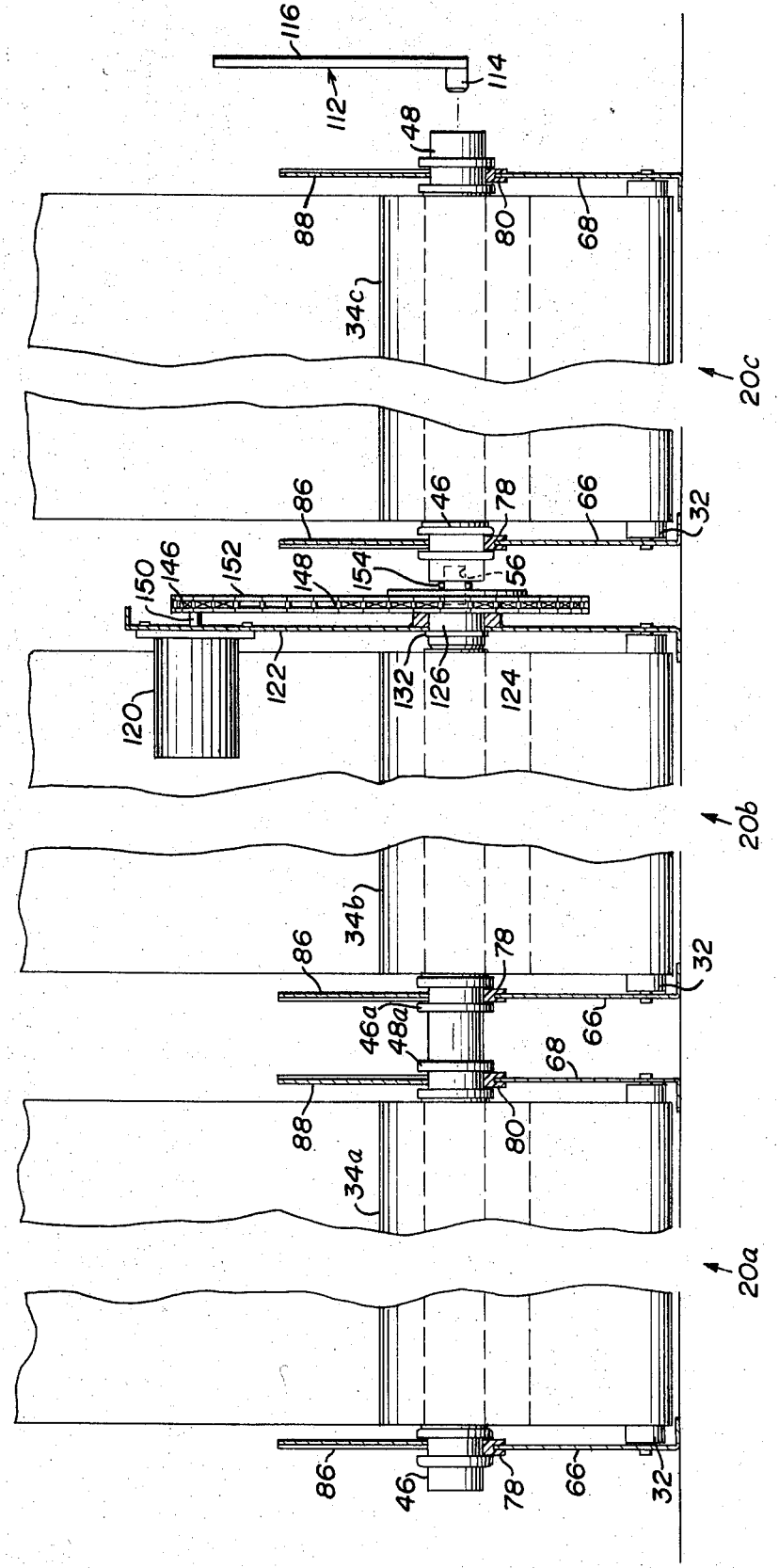

United States Patent Office 3,552,101
Patented Jan. 5, 1971

3,552,101
FILTER APPARATUS
Louis S. Papp, Chagrin Falls, Ohio, assignor to North American Rockwell Corporation, Pittsburgh, Pa., a corporation of Delaware
Filed Jan. 23, 1969, Ser. No. 793,312
Int. Cl. B01d 46/18
U.S. Cl. 55—354                17 Claims

ABSTRACT OF THE DISCLOSURE

An air filter apparatus of the type utilizing as a disposable filter medium at least one web of permeable material which is fed from a supply roll through an air filter zone to a take up roll in which the take up roll is so supported that the take up roll can be readily and rapidly replaced and also so that a series of similar units, each embodying such a web, can be mounted in alignment and have their take up rolls drive connected for concomitant advancement either manually or by a powered drive train.

BACKGROUND AND SUMMARY OF INVENTION

This invention relates to roll type filters. Such filters are normally vertically arranged, having a filter media supply roll journalled at their tops, guide structure by which the filter media is guided from the supply roll, downwardly in a generally vertical plane through an air filter zone and to a take up roll at the bottom of the unit. These units may be used singly or in banks of up to six aligned units for example. The filter media is advanced periodically either manually or under motor control. Where a motor drive is provided, the motor may be actuated manually, by a pressure operated switch, by a timer operated switch, or by a timer with a pressure override. Where a motor drive is used for a bank of filter units, one of the units is equipped with a motor to drive its take up roll and the take up rolls of the remaining units in the bank are drive connected for concomitant advancement with the take up roll of the powered unit. Depending upon the space requirements and limitations, the powered unit may be either an end unit or an intermediate unit of the bank.

The fundamental object of this invention is to provide a take up roll support structure for filters of this type which is adapted, with a minimum number of distinct parts, to accommodate this wide variety of installation requirements and which permits rapid removal of a filled take up roll and replacement with an empty take up roll.

Further and more detailed objects of the present invention will become apparent by reference to the appended claims and from the following detailed description with reference to the accompanying drawings.

DESCRIPTION OF DRAWINGS

FIG. 4 is a perspective view similar to FIG. 3 but showing the take up roll in its normal operative position and with the take up roll retainer gates shown in their closed positions;

FIG. 5 is a fragmentary top elevational view of the take up roll support structure at one end thereof;

FIG. 6 is a side elevational view of one of the bearing segments for the take up roll as illustrated in FIG. 4;

FIG. 7 is an end elevational view of the structure of FIG. 6;

FIG. 8 is an end view of the take up roll end bearing element of the structure of FIG. 4;

FIG. 9 is a side elevational view of the structure of FIG. 8;

FIG. 10 is a fragmentary view showing the interconnection of a series of take up rolls of a bank of filter apparatus units of the type illustrated in FIG. 1.

DETAILED DESCRIPTION

Figure 1:
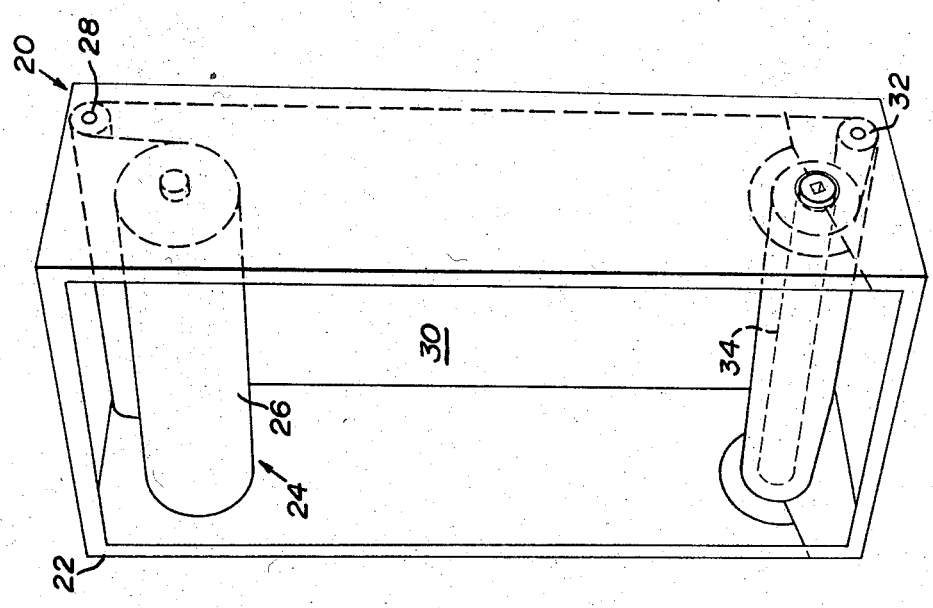
FIG. 1 is a perspective view of a single filter apparatus unit of the type to which the present invention pertains.

Referring now in detail to the drawings and particularly to FIG. 1, there is there illustrated a unitary roll type air filter unit 20. The filter unit 20 embodies an enclosing frame 22 at the top of which is journalled a supply roll 24 of permeable filter media 26. The filter media 26 passes from the supply roll 24 over a guide 28 and downwardly in a substantially vertical plane through an air filter zone designated generally at 30 to a lower guide 32 and to a take up roll indicated generally at 34.

Figure 2:
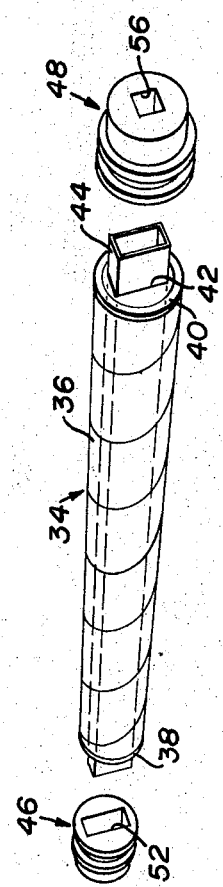
FIG. 2 is an exploded perspective view of the take up roll and the associated bearing members of the apparatus of FIG. 1.

The supply roll 24 and take up roll 34, as best illustrated by the detailed view of the take up roll 34 in FIG. 2, each comprises a disposable tube 36, usually a cardboard cylinder, and metal cup shaped discs 38 and 40 fixed at its opposite ends. The discs 38 and 40 each have a through aperture 42 of non-circular cross section. In the illustrated form the apertures 42 are of rectangular cross section. Extending through the take up roll 34 is a drive shaft 44 which, in the illustrated embodiment, is a hollow rectangular tube of complementary size and shape to the apertures 42.

The assembly formed by the tube 36 and the end cups 38 and 40 is a disposable unit. It is on this assembly that the clean filter media is rolled and supplied to the user and upon this assembly that the used filter media is wound for disposal. The drive shaft 44 is inserted through the tube 36 and its end cups 38 and 40 when this assembly is to be installed at the take up roll position.

After the drive shaft 44 has been inserted through the tube 36 and its end discs 38 and 40, a pair of bearing members 46 and 48 are mounted on its opposite ends. The detailed construction of these bearing members 46 and 48 is illustrated in FIGS. 8 and 9. As there shown, these are metal annular members each having in one face 50 a rectangular socket 52 disposed symmetrically with respect to the axis 54 of the member and a square socket 56 formed in the opposite end. The juncture of the sockets 52 and 56 forms an end wall 58 against which the end of the drive shaft 44 abuts when it is inserted in the socket 52. On the exterior of the members 46 there are formed a pair of radially extending flanges 60 and 62 defining therebetween an annular groove 64, the purpose of which will be explained presently.

Referring again to FIG. 2, it will be seen that when the members 46 and 48 are assembled with the drive shaft 44, the opposite ends of the drive shaft 44 are received within the sockets 52 of the members 46 and 48, and, while axially separable therefrom, when in assembled relation form a drive connection therewith. Thus, if a drive element is inserted in the socket 56 of either the member 46 or 48, rotation can be imparted to the members 46 and 48, the drive shaft 44 and the take up roll 34 concomitantly.

Figure 3:
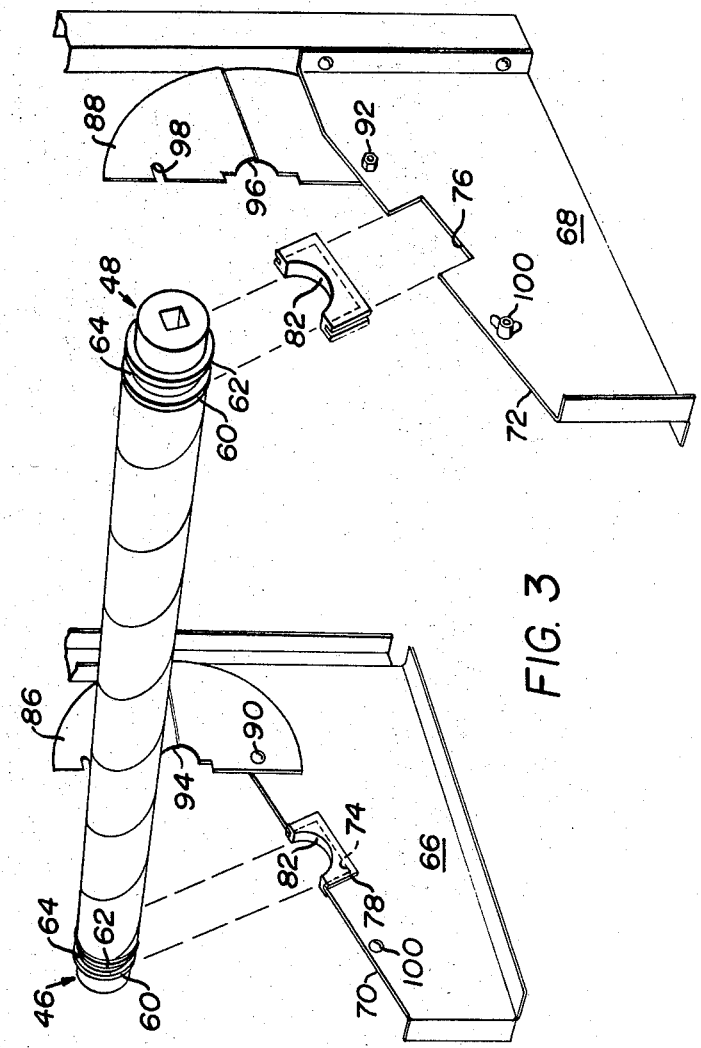
FIG. 3 is an exploded perspective view showing the take up roll and the structure by which it is supported in the apparatus of FIG. 1, the take up roll being shown removed from its support structure and the take up roll retainer gates being shown in their open positions.

The structure for supporting the subassembly of FIG. 2 is illustrated in FIG. 3. As there shown, this support structure comprises a pair of substantially parallel support plates 66 and 68. These support plates have inclined top edges 70 and 72 respectively in which are formed aligned rectangular notches 74 and 76 respectively. Mounted within these notches 74 and 76 are bearing segments 78 and 80 respectively. Bearing segments 78 and 80 are of identical construction, their detailed structure being shown for the bearing segment 78 in FIGS. 6 and 7.

Referring now to those figures, the bearing segments are generally rectangular plates of nylon having a substantially semicylindrical notch 82 in their top face and a peripheral groove 84 extending about its other edges. The groove 84 has a width substantially equal to the thickness of the support plates 66 and 68 and the configuration of the groove 84 is complementary to the configuration of the notches 74 and 76 so that the bearing segments 78 and 80 (see FIG. 3) can be inserted in the notches 74 and 76 in the plates 66 and 68 respectively and are retained therein against rotation and lateral displacement.

The thickness of the bearing segments 78 and 80 and the diameter of the semicylindrical notch 82 are such that the bearing segments 78 and 80 are received within the annular grooves 64 of the members 46 and 48 respectively between the radially extending flanges 60 and 62 thereof. As a result, the bearing segments 78 and 80 form a cradle in which the take up roll of FIG. 2 is rotatably received, the connection between the segments 78 and 80 and the members 46 and 48 respectively providing a journal for the members 46 and 48 and preventing axial movement of the members 46 and 48 relative to the drive shaft 44 so as to thus maintain these elements in axially assembled position.

Referring now to FIGS. 3 and 4, when the assembly of the members 46 and 48, the drive shaft 44 and the take up roll 34 has been placed in the bearing segments 78 and 80, this assembly is retained in place in the bearing segments 78 and 80 by a pair of pivoted gates 86 and 88. Gates 86 and 88 are pivoted upon the support plates 66 and 68 respectively upon pivot pins 90 and 92 respectively. They are formed with central notches 94 and 96 which, when the gates 86 and 88 are pivoted to their closed positions as illustrated in FIG. 4, interfit with the annular groove 64 of the members 46 and 48 to retain these members seated in the bearing segments 78 and 80. The opposite ends of the gates 86 and 88 are formed with a notch 98 which in the closed positions of the gates 86 and 88 embraces a wing nut equipped bolt 100 by which the gates can be clamped in their closed position.

The detailed structure of the gates 86 and 88 is illustrated in FIG. 5. As is there shown, the gate 88 has two halves 102 and 104 which are disposed in parallel planes on opposite sides of the support plate 68, the two halves 102 and 104 being interconnected by an intermediate portion 106. More particularly, the portion 102 is located axially inwardly of the support plate 68 and the portion 104 is located axially outwardly of the support plate 68. The purpose of this construction is best illustrated in FIG. 4. During take up movement, the take up roll 34 is advanced in the direction indicated by the arrow 108. The edge of the filter media as it is wound upon the take up roll 34 passes from the axially inwardly support plate 66 and its edge 70 to the axially outward portion 104 of the disc 86 such that the edge of the filter media is not scraped over the edge 70. Similarly, as the edge of the filter media passes the edge 110 of the disc 86, it is moving away from the edge 110 rather than toward the adjacent portion of the edge 70 of the support plate 66. Thus, there is no tendency as the filter media is wound upon the take up roll 34 in the direction indicated by the arrow 108 for the edges of the filter media to become frayed or tangled with the edges 110 of the gates 86 and 88 or the edges 70 and 72 of the support plates 66 and 68 respectively.

Also illustrated in FIG. 4 is a crank 112 having a lug 114 complementary in form to the sockets 56 of the members 46 and 48 and a handle 116. This crank may be utilized by inserting its lug 114 in the socket 56 to manually advance the take up roll 34 as desired.

FIG. 10 illustrates the manner in which a series of units 20a, 20b, and 20c may be interconnected in a bank when the filter capacity of a single unit will not suffice. As illustrated in FIG. 10, the filter unit 20c is identical with that which has been disclosed with reference to FIGS. 1 through 9.

Figure 11:
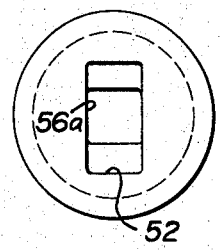
FIGS. 11 and 12 are respectively an end elevation and a side elevation of a pair of integrally connected take up roll end bearing elements for use to interconnect and support the adjacent ends of a pair of coaxial take up rolls in a filter apparatus embodying at least a pair of units as illustrated for the left hand and central units in FIG. 10.
Figure 12:
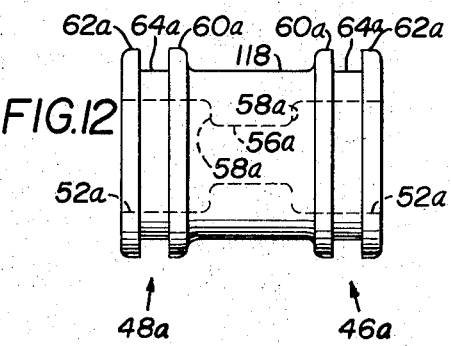

The structure of the unit 20a is identical with the structure of the unit shown in FIGS. 1 through 9 with the exception that the right hand bearing member 48a of the unit 20a is integrally connected with the left hand bearing element 46a of the unit 20b, the composite bearing members 48a and 46a being illustrated in FIGS. 11 and 12. This composite coupling is of generally annular form having a central section 118 of cylindrical external form and a pair of radially extending flanges 60a and 62a at each of its opposite ends defining an annular groove 64a therebetween for the same purpose as the groove 64 and the flanges 60 and 62 of the member illustrated in FIGS. 8 and 9. Rectangular sockets 52a are formed in the opposite ends of this composite coupling and the central opening 56a is of square cross section providing shoulders 58a forming end walls for the sockets 52a. It is thus apparent that the composite coupling of FIGS. 11 and 12 is in effect a pair of the couplings shown in FIGS. 8 and 9 integrally connected in back to back relation.

Referring again to FIG. 10, it is thus apparent that any rotation imparted to the take up roll of either the unit 20a or 20b will be likewise imparted to the take up roll of the other of these two units.

The unit 20b is adapted to be power driven by an electric motor 120 mounted upon a support plate 122 at the right side of the take up roll 34b of the unit 20b. The support plate 122 has a bearing bushing 124 fixed thereto as by welding in axial alignment with the take up roll 34b. Journalled in this bushing 124 is a bearing member 126, the detailed construction of which is illustrated in FIGS. 13 and 14.

Figure 13:
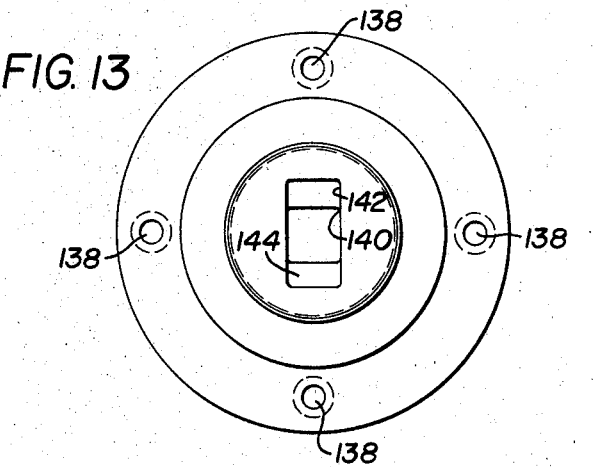
FIGS. 13 and 14 are respectively an end view and side elevational view of a take up roll end bearing element for the end of a take up roll to which a power drive is connected, as illustrated at the right end of the central unit of FIG. 10.
Figure 14:
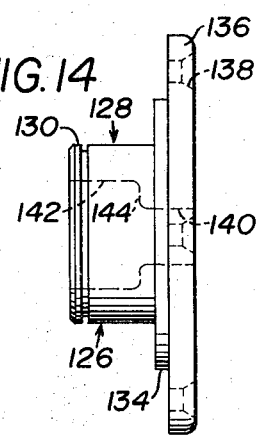

Referring now to FIGS. 13 and 14, the bearing member 126 has a cylindrical surface 128 by which the member 126 is journalled in the bushing 124, an annular groove 130 to receive a retainer ring 132 (see FIG. 10), a radially outwardly extending shoulder 134 at the opposite end of the cylindrical portion 128 and a still further radially outwardly extending flange 136 provided with a plurality of angularly disposed bolt receiving apertures 138. A square aperture 140 is formed through the flange 136 and a rectangular aperture 142 is formed in the opposite end of the bearing member 126, their juncture forming an end wall 144. The apertures 140 and 142 and the end wall 144 perform the same function as the sockets 56 and 52 and the end wall 58 of the coupling illustrated in FIGS. 8 and 9.

Referring again to FIG. 10, the bearing member 126 is journalled in the bushing 124 and retained therein by the retainer ring 132. The drive shaft 44 (not shown in FIG. 10) for the take up roll 34b is received at one end in the socket 142 of the bearing member 126 and at the other end in the socket 52a of the coupling 46a.

A pair of drive sprockets 146 and 148 are mounted respectively upon the output shaft 150 of the drive motor 120 and upon the portion 134 of the member 126 respectively, being interconnected by a drive chain 152. The sprocket 148 is secured to the flange 136 of the member 126 by bolts extending through the apertures 138 thereof into aligned apertures of the sprocket 148.

Units 20b and 20c are interconnected by a drive pin 154 extending between and interfitting in relatively nonrotatable relation with the socket 140 of the member 126 and the socket 56 of the member 46 of the unit 20c to provide a drive connection between the units 20b and 20c.

The unit 20b is provided with a retainer gate 86 at its left hand side so that the composite member 46a–48a can be removed from the left hand support plate 66 of the unit 20b in the same manner that the members 46 and 48 can be removed from their supports, as illustrated in FIGS. 1 through 9. The only essential difference between the unit 20b and the other units 20a and 20c, insofar as disassembly for removal and replacement of the take up rolls is concerned, is that the bearing member 126 remains within the bushing 124 and the drive shaft 44 associated therewith is axially disengaged therefrom before the take up roll 34b is lifted from position.

From the foregoing detailed description, it is apparent that the present invention provides a new and improved take up roll support structure for air filter apparatus of the type utilizing as a disposable filter medium at least one web of permeable material which is fed from a supply roll through an air filter zone to a take up roll. The take up roll is readily removable from its support structure in all types of units, that is, both in power units such as 20b of FIG. 10, slave units such as 20a and 20c of FIG. 10, and such as manually actuated units as illustrated in FIGS. 1 through 9. This is achieved with a maximum commonality of parts. With the exception of the power input end of the powered unit 20b and the composite coupling 48a–46a, all corresponding components of all units are identical and even the composite bearing member 48a–48a is of symmetrical construction with respect to its transverse center line and each half is identical with the individual bearing members 46 and 48.

If desired, still greater commonality of parts could be attained by utilizing a pair of individual bearing members 46 and 48 interconnected by a suitable drive pin in place of the composite bearing member 48a–46a. Similarly, the units 20a, 20b and 20c of FIG. 10 could be identically formed in accordance with the teaching of FIGS. 1 through 9. In such a case, the power unit would be an independent assembly either axially interposed between an adjacent pair of the units or located at an end of the complete assembly. The independent power unit would include a bearing member basically similar to member 126 interconnected by suitable drive pins to the adjacent bearing members 46 and 48.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. In an air filter apparatus utilizing as a disposable filter medium at least one web of permeable material and in which each web of the filter medium is advanced from a supply roll in a supply zone through an air filter zone into a discharge zone having a take up roll, a take up roll support structure comprising:
   (a) a pair spaced bearings;
   (b) a take up roll drive shaft extending through said take up roll;
   (c) means forming a drive connection between said roll and said shaft;
   (d) a pair of members, one at each end of said roll;
   (e) said members and said shaft being formed to axially interfit in rotatively fixed relation to provide a drive connection therebetween, said members being journalled on said bearings, and
   (f) coacting means on said members and said bearings precluding relative axial movement therebetween.

2. The apparatus defined in claim 1 wherein at least one of said bearings is an upwardly open bearing segment providing a cradle and further comprising means for retaining the associated members on said bearing segment.

3. The apparatus as defined in claim 1 wherein at least one of said bearings is an upwardly open bearing segment providing a cradle and said bearings are non-rotatably supported in axial alignment on a pair of parallel substantially vertical support plates.

4. The apparatus as defined in claim 3 wherein said bearing segment is received in a notch in the associated plate and formed with a peripheral groove to embrace opposite sides of said support plates at said notch and thereby preclude relative axial movement therebetween.

5. The apparatus as defined in claim 3 further comprising means for retaining the associated one of said members on said bearing segment.

6. The apparatus as defined in claim 5 wherein said retaining means comprises a gate pivoted on the associated one of said plates at one side of the segment thereon, extending over the associated member and releasably secured to said plate at the opposite side of said segment.

7. The apparatus defined in claim 6 wherein said gate comprises a disc having its opposite end regions offset and disposed in parallel planes on opposite sides of the plane of the associated one of said plates; the direction of rotation of said roll relative to said disc during web take up being such that the edge of any filter media on said roll moves in a direction away from the edges of said disc and plate exposed to the edge of such filter media so that the filter media edge is not subject to abrasion on such plate and disc edges.

8. The apparatus defined in claim 1 wherein said shaft is of non-circular cross section and wherein said members are formed with sockets of complementary cross section into which the ends of said shaft removably interfit so that said take up roll may be removed by opening said gate, lifting the associated member from the associated bearing segment, and axially disengaging said shaft from said members and said take up roll.

9. The apparatus defined in claim 8 wherein the ends of said shaft abut the end walls of the sockets in said members to preclude relative axial movement between said shaft and said members while said members are supported by said bearings.

10. The apparatus defined in claim 6 wherein both of said bearings are bearing segments and both said bearing segments are similarly supported and retained.

11. The apparatus defined in claim 3 wherein the other of said bearings is an annular bushing fixed to the associated support plate and wherein a power input element of a drive train is coaxially fixed to the one of said members journalled in said annular bushing.

12. The apparatus defined in claim 11 wherein said power input element is a sprocket of a chain drive mechanism.

13. The apparatus defined in claim 1 wherein at least one of said pair of members has a socket formed coaxially in the outboard end thereof to receive a drive element such as a drive lug or a crank lug.

14. The apparatus defined in claim 3 wherein there is at least a pair of adjacent and similarly supported and parallel webs having their take up rolls axially aligned, wherein the said members at the adjacent ends of said take up rolls are integrally connected, and wherein both bearings for at least one of said rolls are bearing segments.

15. The apparatus defined in claim 11 wherein there is at least a second web disposed adjacent to and supported and guided similarly to the supporting and guiding of the first said web, the take up rolls for said webs being coaxial, the bearings supporting the said members for the take up roll of the second web being bearing segments, and means forming a drive connection between the said members at the adjacent ends of said take up rolls whereby said take up rolls are concomitantly rotatable.

16. The apparatus defined in claim 15 wherein the second web is disposed at the side of the first said web remote from said power input element and wherein said means forming a drive connection between said members is an integral connection.

17. The apparatus defined in claim 15 wherein the second web is disposed at the side of the first said web adjacent said power input element and wherein said means forming a drive connection between said members is a drive lug extending between and axially slidably but non-rotatably received in aligned complementary sockets in the adjacent ends of the said members.

References Cited

UNITED STATES PATENTS

| | | | |
|---|---|---|---|
| 1,408,283 | 2/1922 | Ferdon | 211—16 |
| 1,995,378 | 3/1935 | Dahlman | 55—353 |
| 2,218,453 | 10/1940 | Mickle | 55—352X |
| 2,668,586 | 2/1954 | Luckie | 160—268 |
| 3,176,928 | 4/1965 | Saunders | 242—58.6 |
| 3,280,539 | 10/1966 | Parrott | 55—354 |
| 3,296,780 | 1/1967 | Revell | 55—354 |
| 3,350,854 | 11/1967 | Revell | 55—354 |
| 3,350,855 | 11/1967 | Revell | 55—354 |
| 3,359,709 | 12/1967 | Revell | 55—354 |

DENNIS E. TALBERT, JR., Primary Examiner

U.S. Cl. X.R.

242—67.3, 68.1; 308—1, 239